(12) United States Patent
Honda et al.

(10) Patent No.: US 9,857,723 B2
(45) Date of Patent: Jan. 2, 2018

(54) LIGHT BEAM SCANNING APPARATUS AND LIGHT BEAM SCANNING METHOD

(71) Applicants: Yuki Honda, Kanagawa (JP); Katsuhiko Maeda, Kanagawa (JP)

(72) Inventors: Yuki Honda, Kanagawa (JP); Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/204,241

(22) Filed: Jul. 7, 2016

(65) Prior Publication Data

US 2017/0031264 A1    Feb. 2, 2017

(30) Foreign Application Priority Data

Jul. 31, 2015  (JP) ................................. 2015-152457

(51) Int. Cl.
G03G 15/043     (2006.01)
G02B 26/12      (2006.01)

(52) U.S. Cl.
CPC ......... *G03G 15/043* (2013.01); *G02B 26/123* (2013.01); *G02B 26/127* (2013.01); *G02B 26/129* (2013.01); *G03G 2215/0409* (2013.01)

(58) Field of Classification Search
CPC . G03G 15/043; G03G 2215/0407–2215/0414; G02B 26/123; G02B 26/127; G02B 26/129
See application file for complete search history.

(56) References Cited

U.S. PATENT DOCUMENTS

| 5,965,869 A | 10/1999 | Masuda et al. |
| 6,831,672 B2 | 12/2004 | Maeda |
| 6,833,856 B2 | 12/2004 | Maeda |

(Continued)

FOREIGN PATENT DOCUMENTS

| JP | H10-166649 | 6/1998 |
| JP | 2005-193452 | 7/2005 |
| JP | 2007-148356 | 6/2007 |

OTHER PUBLICATIONS

U.S. Appl. No. 15/062,532, filed Mar. 7, 2016.

*Primary Examiner* — Carla Therrien
(74) *Attorney, Agent, or Firm* — Oblon, McClelland, Maier & Neustadt, L.L.P.

(57) ABSTRACT

A light-beam-scanning apparatus includes first and second array-light sources including plural light-emitting units and a light-receiving unit; first and second light-source-control units for controlling light emission of the light-emitting units; a write-control unit for controlling the light-source-control units; a deflection unit for deflecting a direction of light emitted from the light-emitting units; and a synchronization-detection element for generating a synchronization-detection signal according to the light deflected by the deflection unit incident onto the synchronization-detection element. Initialization of the light-emitting units of the second array-light source is performed after initialization of the first array-light source is performed; and when the initialization of the light-emitting units of the first array-light source is being performed, a signal for causing the light-emitting units of the second array-light source not to emit light is input to the second light-source-control unit.

10 Claims, 10 Drawing Sheets

(56) References Cited

U.S. PATENT DOCUMENTS

| | | |
|---|---|---|
| 6,847,390 B2 | 1/2005 | Maeda |
| 6,853,392 B2 | 2/2005 | Maeda |
| 6,999,708 B2 | 2/2006 | Maeda |
| 7,215,353 B2 | 5/2007 | Maeda |
| 7,224,378 B2 | 5/2007 | Maeda |
| 7,294,824 B2 | 11/2007 | Maeda |
| 7,313,352 B2 | 12/2007 | Shinohara et al. |
| 7,415,231 B2 | 8/2008 | Maeda |
| 7,508,408 B2 | 3/2009 | Kanzaki et al. |
| 7,586,510 B2 | 9/2009 | Maeda |
| 7,595,812 B2 | 9/2009 | Maeda |
| 7,627,277 B2 | 12/2009 | Maeda |
| 7,679,634 B2 | 3/2010 | Komai et al. |
| 7,742,377 B2 | 6/2010 | Maeda |
| 7,760,222 B2 | 7/2010 | Maeda |
| 8,305,416 B2 | 11/2012 | Maeda |
| 8,866,865 B2 | 10/2014 | Maeda |
| 9,063,455 B2 | 6/2015 | Maeda et al. |
| 2007/0210245 A1 | 9/2007 | Maeda |
| 2012/0182373 A1* | 7/2012 | Hayashi .................. B41J 2/455 347/224 |
| 2016/0077457 A1 | 3/2016 | Honda et al. |
| 2017/0031266 A1* | 2/2017 | Igarashi ............... G03G 15/043 |

* cited by examiner

LIGHT BEAM SCANNING APPARATUS AND LIGHT BEAM SCANNING METHOD

BACKGROUND OF THE INVENTION

1. Field of the Invention

The present disclosure relates to a light beam scanning apparatus and a light beam scanning method.

2. Description of the Related Art

A light source referred to as a laser diode (LD) or a semiconductor laser that is used in an electrophotography type image forming apparatus, detects characteristics of the light source according to an initialization operation, and performs high-precision light amount control. The initialization of the light source is started by a control signal and initialization time of the light source is controlled by a synchronization detection signal The synchronization detection signal is generated by a synchronization element such as a synchronization detection sensor. Normally, one light source is controlled by one synchronization detection element. In this case, the same number of the synchronization detection elements as the number of the light sources is needed, the number of parts increases, and the cost increases. Therefore, in order to lower the cost, a method is known in which multiple light sources are controlled by one synchronization detection element (e.g., two light sources are controlled by one synchronization detection element).

It should be noted that, when initialization of multiple array light sources is performed by using one synchronization detection element, the initialization is performed not only for one light source but also for the other light sources that share the synchronization detection element with the light source. As a result, there may be a case where characteristics of a LD as a light source cannot be properly detected.

Therefore, a light beam scanning apparatus that can perform properly the initialization of multiple array light sources with an inexpensive structure is required.

CITATION LIST

Patent Document

[Patent Document 1] Japanese Laid-Open Patent Application No. 2007-148356
[Patent Document 2] Japanese Laid-Open Patent Application No. 10-166649
[Patent Document 3] Japanese Laid-Open Patent Application No. 2005-193452

SUMMARY OF THE INVENTION

A light beam scanning apparatus is provided. The light beam scanning apparatus includes a first array light source configured to include a plurality of light-emitting units and a light-receiving unit; a second array light source configured to include a plurality of light-emitting units and a light-receiving unit; a first light source control unit configured to control light emission of the light-emitting units of the first array light source; a second light source control unit configured to control light emission of the light-emitting units of the second array light source; a write control unit configured to control the first light source control unit and the second light source control unit; a deflection unit configured to deflect a direction of light emitted from the light-emitting units of the first array light source and the light-emitting units of the second array light source; and a synchronization detection element configured to generate a synchronization detection signal according to the light deflected by the deflection unit incident onto the synchronization detection element. APC signals corresponding to the light-emitting units are respectively input to the first light source control unit and the second light source control unit. The APC signal includes a line APC signal corresponding to the light-emitting unit and generated based on the synchronization detection signal, and an initialization signal for initializing the light-emitting units. Initialization of the light-emitting units of the second array light source is performed after initialization of the light-emitting units of the first array light source is performed; and when the initialization of the light-emitting units of the first array light source is being performed, a signal for causing the light-emitting units of the second array light source not to emit light is input to the second light source control unit.

A light beam scanning apparatus according to an embodiment can perform properly the initialization of multiple array light sources with an inexpensive structure.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present disclosure will be described. It should be noted that the same reference number will be assigned to the same element and duplicated description will be omitted.

(Image Forming Apparatus)

Figure 1:
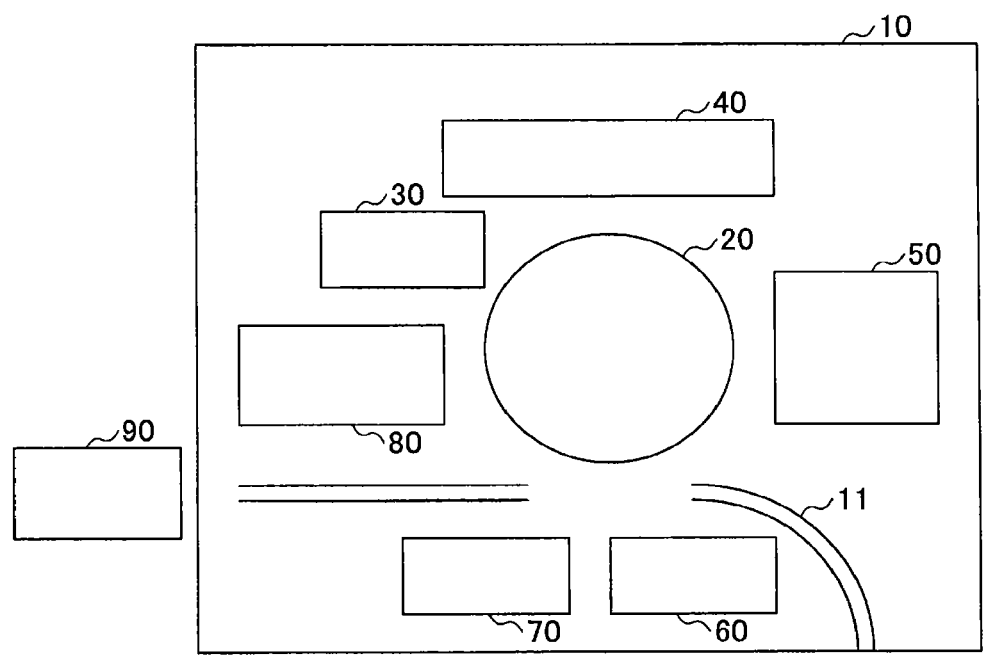
FIG. 1 is a diagram illustrating an image forming apparatus according to an embodiment.

Referring to FIG. 1, an image forming apparatus in which a light beam scanning apparatus according to an embodiment is used will be described. FIG. 1 illustrates a schematic structure of a laser printer as an image forming apparatus in which a light beam scanning apparatus according to an embodiment is used.

As illustrated in FIG. 1, the laser printer includes an image forming unit 10, a fixing unit 90, etc. Further, the laser printer may include an image processing unit for performing image processing necessary for print data, a paper feeding unit for feeding print paper to the image forming unit 10, a paper ejection unit for ejecting print paper onto a paper ejection tray, etc. An image is formed on the print paper by the image forming unit 10 and fixed by the fixing unit 90. Further, the laser printer may include a data reception unit for receiving the print data from an external apparatus (a personal computer, a scanner, etc.), an operation display unit that has an operation key for setting various operation modes, etc., of the laser printer, a display portion for displaying information, etc.

The image forming unit 10 includes a cylindrical photoconductor 20 that is rotationally driven. There are a charging unit 30, a light write unit 40, a developing unit 50, a transfer unit 60, a separating unit 70, a cleaning unit 80, etc., around the photoconductor 20. It should be noted that a light beam scanning apparatus according to an embodiment corresponds to the light write unit 40.

In the image forming unit 10, after the photoconductor 20 is uniformly charged by the charging unit 30, an electrostatic latent image is formed on the photoconductor 20 by irradiating the photoconductor 20 with a laser beam that is modulated based on image data. Next, a toner image as a developer image is formed by having toner (developer) adhered to the photoconductor 20 by using the developing unit 50. Next, in the transfer unit 60, the toner image on the photoconductor 20 is transferred onto print paper as a recording medium fed in between the photoconductor 20 and the transfer unit 60 from a paper feeding unit through a paper feeding path 11. Next, the print paper on which the toner image is transferred is separated from the photoconductor 20 by the separating unit 70, and conveyed to the fixing unit 90.

The fixing unit 90 includes a heating roller which is rotationally driven and heated to a predetermined fixing temperature; a pressure roller which abuts the heating roller and rotates with the heating roller; a heater used for heating the heating roller to the predetermined fixing temperature; etc. In the fixing unit 90, the print paper on which the toner image is transferred is heated, pressed, and conveyed by the heating roller and the pressure roller, and an image is formed by having the toner image fixed on the print paper.

Further, in the image forming unit 10, after the toner image is transferred onto the print paper, the remaining charge and remaining toner are removed from the photoconductor 20 by the cleaning unit 80, the photoconductor 20 is charged uniformly by the charging unit 30, and image forming is performed again.

(Light Beam Scanning Apparatus)

Figure 2:
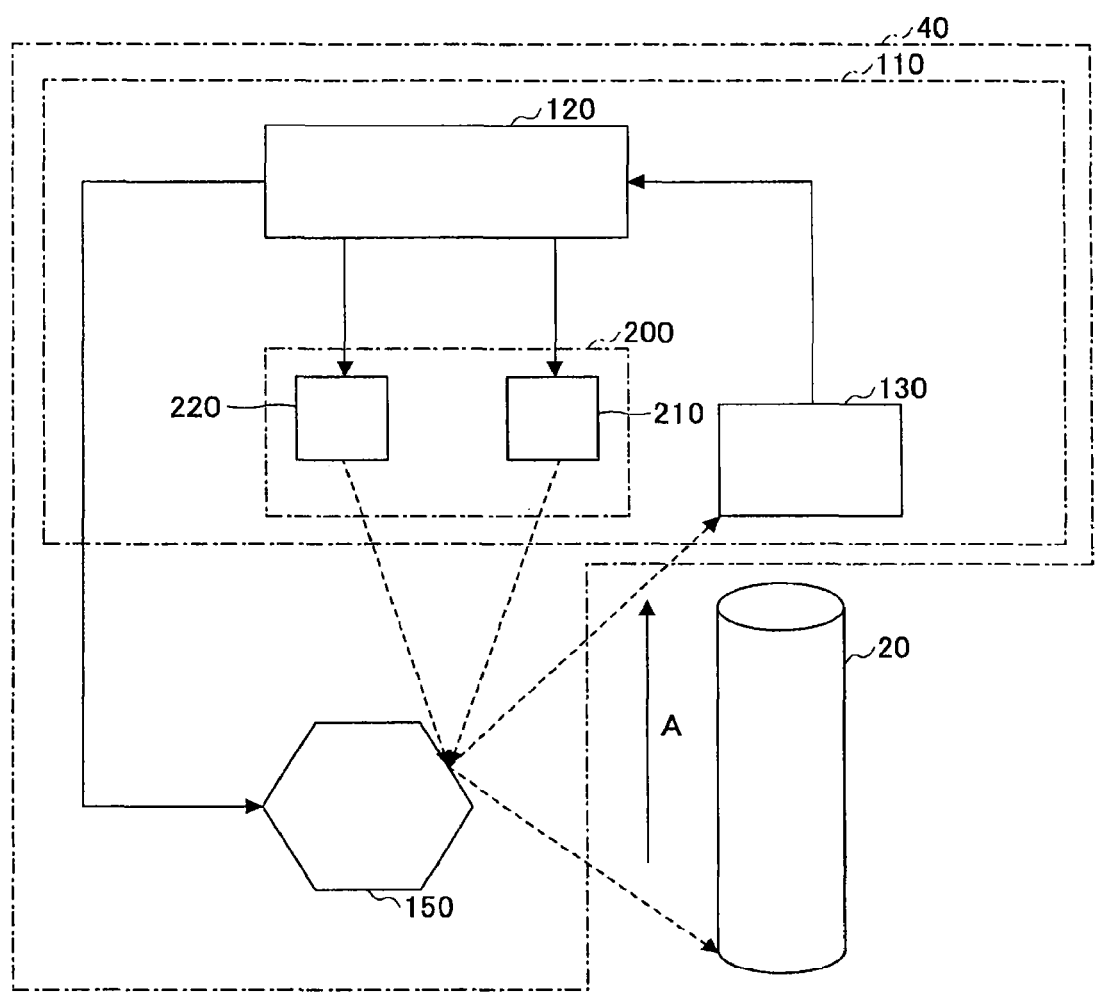
FIG. 2 is a drawing illustrating a light beam scanning apparatus according to an embodiment.

Next, referring to FIG. 2, a light beam scanning apparatus according to an embodiment will be described. In FIG. 2, a dashed line with an arrow indicates a laser beam as a light beam.

The light write unit 40 includes a light write driving unit 110, a polygon mirror 150 that functions as a deflection unit, etc. The polygon mirror 150 that functions as a deflection unit rotates at an angular velocity according to an image density of the laser printer, and deflects laser light emitted from the light source. The light write driving unit 110 includes a light source unit 200 that has a plurality of laser diodes (LD) from which the laser beam is emitted; a light scanning control unit 120 for controlling the light source unit 200, etc.; a synchronization detection element 130; a fθ lens; a reflecting mirror; a synchronization reflecting mirror; mirror; etc.

Mirrors are formed on a plurality of (e.g., six) surfaces of the polygon mirror 150. The laser beam emitted from the laser diodes (LD) of the light source unit 200 is reflected by the rotating polygon mirror 150, transmitted through the fθ lens, reflected by the reflecting mirror, and thereby an image is formed on the photoconductor 20.

A direction of the laser beam reflected by the reflecting mirror of the polygon mirror 150 moves in a direction indicated by an arrow A according to the rotation of the polygon mirror 150. As a result, a position at which the image is formed on the photoconductor 20 also moves in the direction indicated by the arrow A. The direction indicated by the arrow A is a bus direction of the cylindrical photoconductor 20, and is also a main-scanning direction of the image.

The laser beam, emitted from the light source unit 200 and transmitted through the fθ lens, is incident onto the synchronization reflecting mirror disposed near a position deviated from an image forming area of the photoconductor 20, which position is on a laser beam scanning line of the photoconductor 20. The laser beam incident onto the synchronization reflecting mirror is reflected toward the synchronization detection element 130, and is incident onto the synchronization detection element 130.

The synchronization detection element 130 includes a photodiode or the like, and when the laser beam is incident onto the synchronization detection element 130, a synchronization detection signal, which is a pulse output, is generated. The generated synchronization detection signal is transmitted to the light scanning control unit 120. The light scanning control unit 120 sets an effective scanning period during which an image is written on the photoconductor 20 based on the synchronization detection signal. It should be noted that the light scanning control unit 120 controls the light source unit 200, the polygon mirror 150, etc.

According to an embodiment, the light source unit 200 includes a first array light source 210 and a second array light source 220. The first array light source 210 includes a plurality of light-emitting units, and the second array light source 220 includes a plurality of light-emitting units. Each of the light emitting units emits laser light.

(Write Control without Sharing Synchronization Detection Signal)

Figure 3:
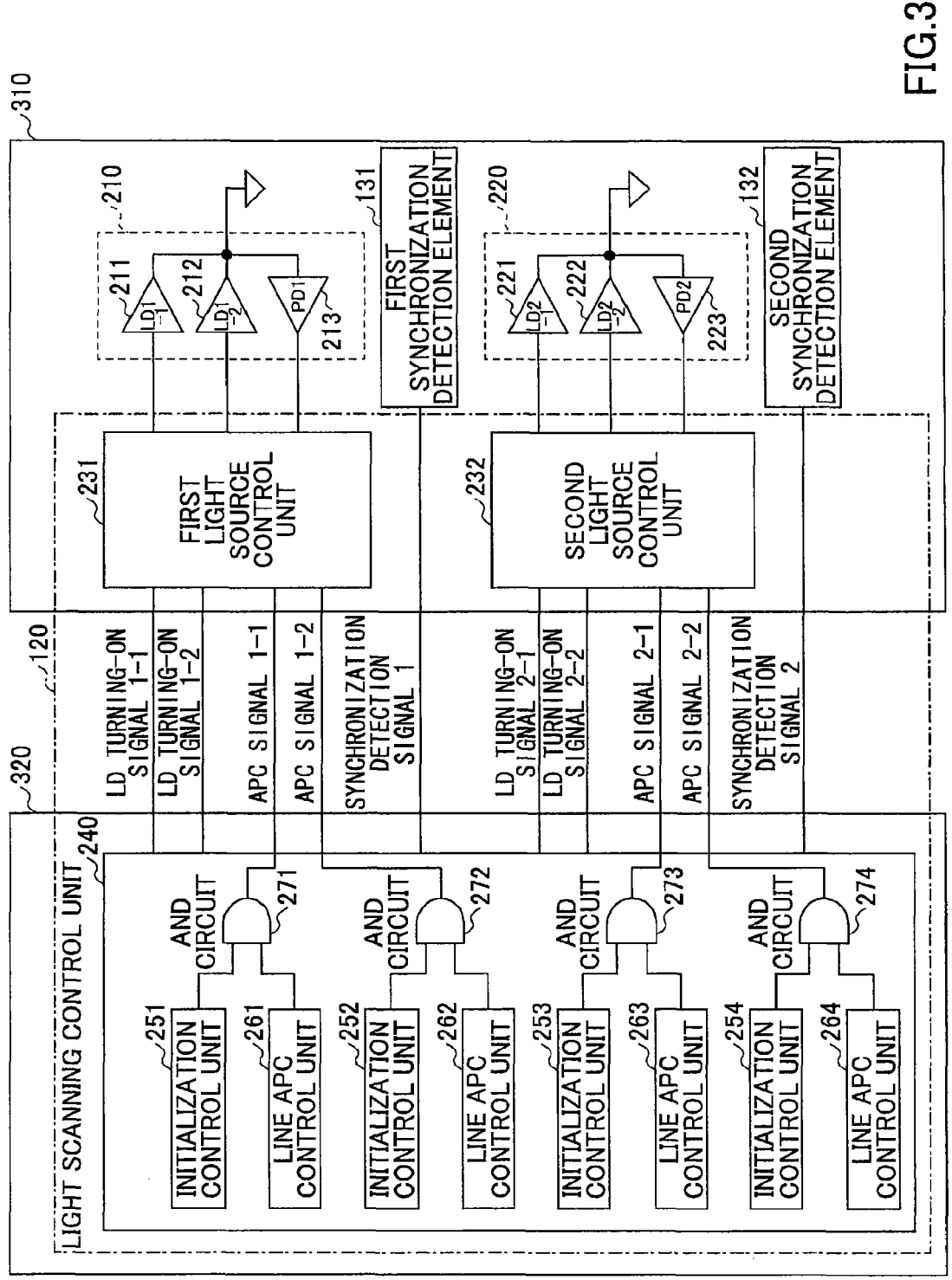
FIG. 3 is a diagram illustrating a light write driving unit in the case where a synchronization detection signal is not shared.
Figure 4:
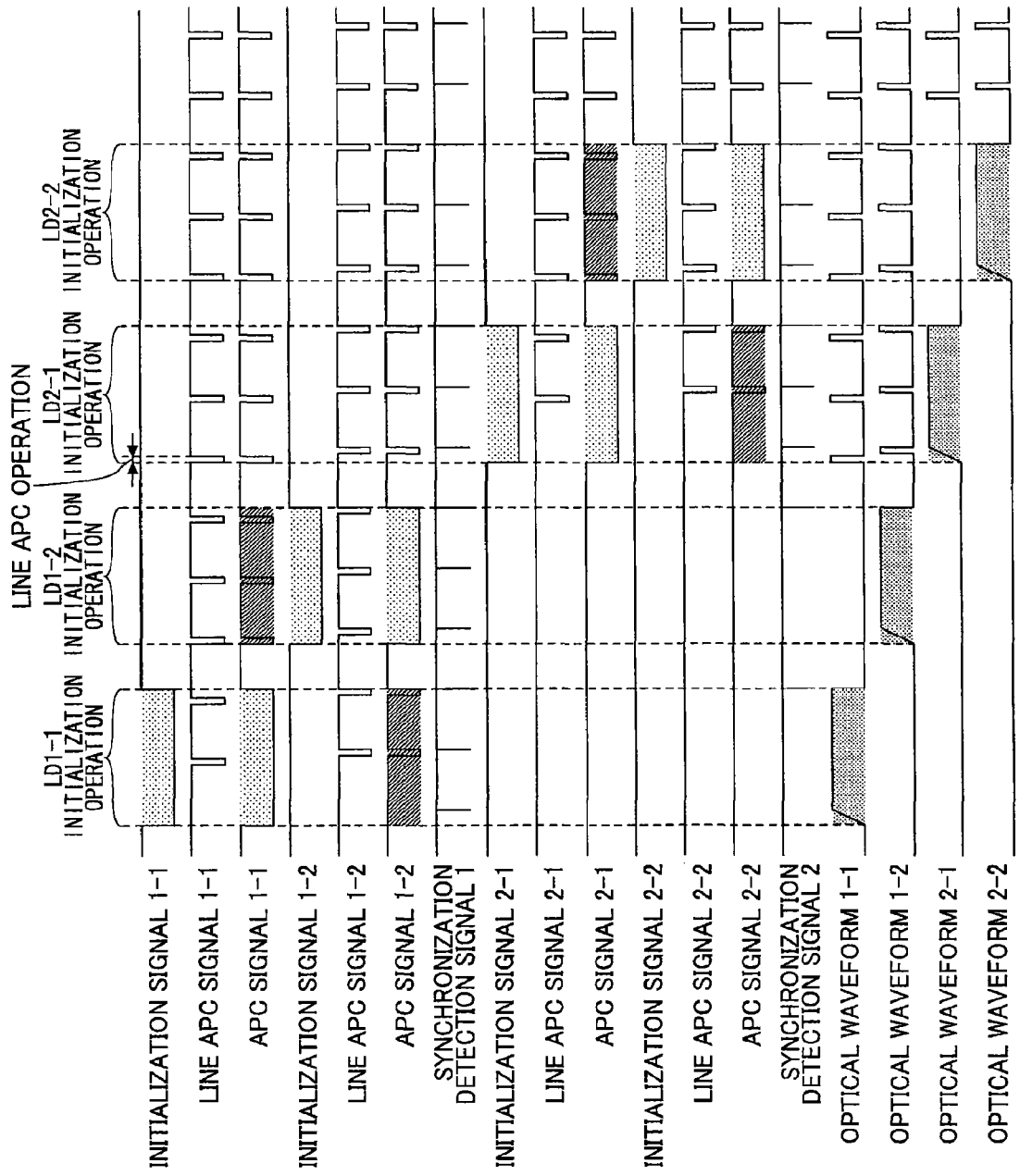
FIG. 4 is a timing chart illustrating initialization of a light source in the case where a synchronization detection signal is not shared.

Here, referring to FIG. 3 and FIG. 4, write control without sharing synchronization detection signal will be described. FIG. 3 illustrates a structure of a light write driving unit in the case where a synchronization detection signal is not shared.

The light write driving unit, in the case where a synchronization detection signal is not shared, includes a plurality of synchronization detection elements for generating a synchronization detection signal. Specifically, the light write driving unit illustrated in FIG. 3 includes the first array light source 210, the second array light source 220, a first synchronization detection element 131, a second synchronization detection element 132, a first light source control unit 231, a second light source control unit 232, a write control unit 240, etc. It should be noted that, in the light write driving unit illustrated in FIG. 3, a light scanning control unit is formed by the first light source control unit 231, the second light source control unit 232, and the write control unit 240, indicated by a dashed line.

The light write driving unit illustrated in FIG. 3 is formed by two substrates including a light source control substrate 310 and a write control substrate 320. The light source control substrate 310 is connected to the write control substrate 320 by a connection part such as a harness. The light source control substrate 310 includes the first array light source 210, the second array light source 220, the first synchronization detection element 131, the second synchronization detection element 132, the first light source control unit 231, the second light source control unit 232, etc. Further, the write control substrate 320 includes the write control unit 240, etc. It should be noted that a power supply and a GND (ground potential) are connected to the light write driving unit by a connection part such as a harness.

The first synchronization detection element 131 is disposed at a position onto which the laser light, which is emitted from the first array light source 210 and reflected by the rotating polygon mirror 150, is incident. The second synchronization detection element 132 is disposed at a position onto which the laser light, which is emitted from the second array light source 220 and reflected by the rotating polygon mirror 150, is incident.

The first array light source 210 includes a first light-emitting unit (LD1-1) 211, a second light-emitting unit (LD1-2) 212, a light-receiving unit (PD1) 213, etc. The second array light source 220 includes a first light-emitting unit (LD2-1) 221, a second light-emitting unit (LD2-2) 222, a light-receiving unit (PD2) 223, etc.

In the first array light source 210, the first light-emitting unit 211 and the second light-emitting unit 212 emit laser light independently. A part of the laser light emitted from the first light-emitting unit 211 and the second light-emitting unit 212 is incident onto the light-receiving unit 213, and an amount of light of the emitted laser light is detected. Similarly, in the second array light source 220, the first light-emitting unit 221 and the second light-emitting unit 222 emit laser light independently. A part of the laser light emitted from the first light-emitting unit 221 and the second light-emitting unit 222 is incident onto the light-receiving unit 223, and an amount of light of the emitted laser light is detected.

The first array light source 210 is connected to the first light source control unit 231. The first light source control unit 231 controls the light emission of the first light-emitting unit 211 and the second light-emitting unit 212 of the first array light source 210. Further, a signal from the light-receiving unit 213 is input to the first light source control unit 231. The second array light source 220 is connected to the second light source control unit 232. The second light source control unit 232 controls the light emission of the first light-emitting unit 221 and the second light-emitting unit 222 of the second array light source 220. Further, a signal from the light-receiving unit 223 is input to the second light source control unit 232.

The write control unit 240 includes initialization control units, line APC control units, and AND circuits as logic elements, the numbers of which correspond to the number of the light-emitting units. It should be noted that an initialization signal output from the initialization control unit and a line APC signal output from the line APC control unit are low-active (L active), which operate in a L state. Therefore, the signals are asserted in a L state and negated in a H state.

Specifically, the write control unit 240 includes an initialization control unit 251, a line automatic power control (APC) control unit 261, and an AND circuit 271, which correspond to the first light-emitting unit 211 of the first array light source 210. It should be noted that the AND circuit outputs a logical conjunction of input signals. The initialization control unit 251 outputs an initialization signal 1-1 for initialization of the first light-emitting unit 211 of the first array light source 210. The line APC control unit 261 outputs a line APC signal for APC control of the first light-emitting unit 211 of the first array light source 210. The initialization signal 1-1 output from the initialization control unit 251 and the line APC signal 1-1 output from the line APC control unit 261 are input to the AND circuit 271. The AND circuit 271 outputs a logical conjunction of the initialization signal 1-1 and the line APC signal 1-1 as an APC signal 1-1.

Further, the write control unit 240 includes an initialization control unit 252, a line APC control unit 262, and an AND circuit 272, which correspond to the second light-emitting unit 212 of the first array light source 210. The initialization control unit 252 outputs an initialization signal 1-2 for initialization of the second light-emitting unit 212 of the first array light source 210. The line APC control unit 262 outputs a line APC signal 1-2 for APC control of the second light-emitting unit 212 of the first array light source 210. The initialization signal 1-2 output from the initialization control unit 252 and the line APC signal 1-2 output from the line APC control unit 262 are input to the AND circuit 272. The AND circuit 272 outputs a logical conjunction of the initialization signal 1-2 and the line APC signal 1-2 as an APC signal 1-2.

Further, the write control unit 240 includes an initialization control unit 253, a line APC control unit 263, and an AND circuit 273, which correspond to the first light-emitting unit 221 of the second array light source 220. The initialization control unit 253 outputs an initialization signal 2-1 for initialization of the first light-emitting unit 221 of the second array light source 220. The line APC control unit 263 outputs a line APC signal 2-1 for APC control of the first light-emitting unit 221 of the second array light source 220. The initialization signal 2-1 output from the initialization control unit 253 and the line APC signal 2-1 output from the line APC control unit 263 are input to the AND circuit 273. The AND circuit 273 outputs a logical conjunction of the initialization signal 2-1 and the line APC signal 2-1 as an APC signal 2-1.

Further, the write control unit 240 includes an initialization control unit 254, a line APC control unit 264, and an AND circuit 274, which correspond to the second light-emitting unit 222 of the second array light source 220. The initialization control unit 254 outputs an initialization signal 2-2 for initialization of the second light-emitting unit 222 of the second array light source 220. The line APC control unit 264 outputs a line APC signal 2-2 for APC control of the second light-emitting unit 222 of the second array light source 220. The initialization signal 2-2 output from the initialization control unit 254 and the line APC signal 2-2 output from the line APC control unit 264 are input to the AND circuit 274. The AND circuit 274 outputs a logical conjunction of the initialization signal 2-2 and the line APC signal 2-2 as an APC signal 2-2.

The first light source control unit 231 is connected to the write control unit 240. The APC signal 1-1, the APC signal 1-2, an LD turning-on signal 1-1, an LD turning-on signal 1-2, output from the write control unit 240, are input to the first light source control unit 231. Further, the first synchronization detection element 131 outputs a synchronization detection signal 1 when the laser light reflected by a mirror surface of the rotating polygon mirror 150 is incident onto the first synchronization detection element 131. The output synchronization detection signal 1 is input to the write control unit 240. The first synchronization detection element 131 corresponds to the first array light source 210. The laser light emitted from the first light-emitting unit 211 and the second light-emitting unit 212 of the first array light source 210 is reflected by the mirror surface of the polygon mirror 150. The reflected laser light is incident onto the first synchronization detection element 131.

The second light source control unit 232 is connected to the write control unit 240. The APC signal 2-1, the APC signal 2-2, an LD turning-on signal 2-1, an LD turning-on signal 2-2, output from the write control unit 240, are input to the second light source control unit 232. Further, the second synchronization detection element 132 outputs a synchronization detection signal 2 when the laser light reflected by the mirror surface of the rotating polygon mirror 150 is incident onto the second synchronization detection element 131. The output synchronization detection signal 2 is input to the write control unit 240. The second synchronization detection element 132 corresponds to the second array light source 220. The laser light emitted from the first light-emitting unit 221 and the second light-emitting unit 222 of the second array light source 220 is reflected by the mirror surface of the polygon mirror 150. The reflected laser light is incident onto the second synchronization detection element 132.

The first light source control unit 231 controls timing of lighting the first light-emitting unit 211 of the first array light source 210 according to the LD turning-on signal 1-1, and controls timing of line APC lighting and timing of turning on for initialization according to the APC signal 1-1. Further, the first light source control unit 231 controls timing of lighting the second light-emitting unit 212 of the first array light source 210 according to the LD turning-on signal 1-2, and controls timing of line APC lighting and timing of turning-on for initialization according to the APC signal 1-2.

The second light source control unit 232 controls timing of lighting the first light-emitting unit 221 of the second array light source 220 according to the LD turning-on signal 2-1, and controls timing of line APC lighting and timing of turning-on for initialization according to the APC signal 2-1. Further, the second light source control unit 232 controls timing of lighting the second light-emitting unit 222 of the second array light source 220 according to the LD turning-on signal 2-2, and controls timing of line APC lighting and timing of turning-on for initialization according to the APC signal 2-2.

Compared with other control signals such as the line APC signal, the initialization signal is used less frequently. Therefore, in order to reduce cost, signal lines are reduced by outputting, by the AND circuit, a logical conjunction of the initialization signal and the line APC signal as the APC signal.

Next, referring to FIG. 4, operations of the light write driving unit without sharing the synchronization detection signal illustrated in FIG. 3 will be described.

When power supply of the light scanning control unit is turned on, the light scanning control unit starts controlling the first array light source 210 and the second array light source 220 which are in a turn-off (no-lit) state. First, the light scanning control unit performs initialization of the first light-emitting unit 211 of the first array light source 210. Initialization of the first light-emitting unit 211 of the first array light source 210 is performed by causing the first light-emitting unit 211 of the first array light source 210 to be turned on and emit light as illustrated by an optical waveform 1-1 according to the initialization signal 1-1.

Specifically, the initialization signal 1-1 and the line APC signal 1-1 are low-active signals, and the first light-emitting unit 211 of the first array light source 210 is turned on when the signals are in a L state. A logical conjunction of the initialization signal 1-1 and the line APC signal 1-1 is output as the APC signal 1-1 by the AND circuit 271. Therefore, in the case where the initialization signal 1-1 is in a L state, the APC signal 1-1 output from the AND circuit 271 is also in a L state. With the above operation, the first light-emitting unit 211 of the first array light source 210 is turned on, and laser light is emitted from the first light-emitting unit 211 of the first array light source 210. In this state, the polygon mirror 150 is rotating, and the laser light emitted from the first light-emitting unit 211 of the first array light source 210 is incident onto the first synchronization detection element 131 at a timing corresponding to the rotation of the polygon mirror 150. In the first synchronization detection element 131, a synchronization detection signal 1 is generated and transmitted to the write control unit 240 every time the laser light is incident onto the first synchronization detection element 131. The synchronization detection signal 1 is also a low-active signal. After the first light-emitting unit 211 of the first array light source 210 is turned on, when the synchronization detection signal 1 is input to the write control unit 240 for a predetermined number of times (e.g., three times as illustrated in FIG. 4), the initialization signal 1-1 becomes a H state. When the initialization signal 1-1 becomes a H state, the APC signal 1-1 output from the AND circuit 271 also becomes a H state, and the first light-emitting unit 211 of the first array light source 210 is turned off.

The line APC signal 1-1 and the line APC signal 1-2 are generated by the line APC control unit 261 and the line APC control unit 262, respectively, according to the synchronization detection signal 1 input to the write control unit 240. The APC signal 1-1 and the APC signal 1-2 output from the write control unit 240 are input to the first light source control unit 231. The first light source control unit 231 is controlled in such a way that the APC signal of one light-emitting unit is not accepted when the other light-emitting unit is being initialized. Specifically, the first light source control unit 231 is controlled in such a way that the line APC signal 1-2 is not accepted when the first light-emitting unit 211 of the first array light source 210 is being initialized. With the above operation, a state is maintained in which only the first light-emitting unit 211 of the first array light source 210 is turned on and the second light-emitting unit 212 of the first array light source 210 is not turned on. As a result, the first light-emitting unit 211 of the first array light source 210 can be initialized.

It should be noted that the second light source control unit 232 controls the first light-emitting unit 221 and the second light-emitting unit 222 of the second array light source 220 in the same way. Specifically, laser light emitted by the first light-emitting unit 221 or the second light-emitting unit 222 of the second array light source 220 is reflected by the polygon mirror 150. The reflected laser light is incident onto the second synchronization detection element 132, and the synchronization detection signal 2 is generated. The synchronization detection signal 2 generated as described above is input to the write control unit 240. At the write control unit 240, the line APC signal 2-1 and the line APC signal 2-2 are generated according to the synchronization detection signal 2.

In an embodiment, "initialization" means to cause a light-emitting unit of an array light source to emit light, obtain information at a light-receiving unit, and, based on the obtained information, further obtain information including an oscillation threshold of the laser light emitted by the light-emitting unit, a relationship between flowing current and an amount of light, etc. The information obtained by the initialization is stored in a storage unit, etc., included in a light write unit or the like as a light beam scanning apparatus. When a line APC operation of the light-emitting unit is performed, the amount of the laser light emitted by the light-emitting unit is controlled to be uniform according to the information obtain by the initialization.

After the initialization of the first light-emitting unit 211 of the first array light source 210 is completed, the initialization of the second light-emitting unit 212 of the first array light source 210 is performed in the similar manner. Initialization of the second light-emitting unit 212 of the first array light source 210 is performed by causing the second light-emitting unit 212 of the first array light source 210 to be turned on and emit light as illustrated by an optical waveform 1-2 according to the initialization signal 1-2.

Similarly, after the initialization of the second light-emitting unit 212 of the first array light source 210 is completed, initialization of the first light-emitting unit 221 of the second array light source 220 is performed. After the initialization of the first light-emitting unit 221 of the second array light source 220 is completed, initialization of the second light-emitting unit 222 of the second array light source 220 is performed. In FIG. 4, an optical waveform of the first light-emitting unit 221 of the second array light source 220 is illustrated by an optical waveform 2-1, and an optical waveform of the second light-emitting unit 222 of the second array light source 220 is illustrated by an optical waveform 2-2.

The light write driving unit illustrated in FIG. 3 includes the first synchronization detection element 131 corresponding to the first array light source 210 and the second synchronization detection element 132 corresponding to the second array light source 220. Therefore, the synchronization detection signal is not shared by the first array light source 210 and the second array light source 220 in the light write driving unit.

(Write Control Sharing Synchronization Detection Signal)

It should be noted that further cost reduction is required for the light scanning apparatus. If the two synchronization detection elements of the light write driving unit illustrated in FIG. 3 are reduced to one, then a further cost reduction can be achieved. In the case where the number of the synchronization detection elements is reduced to one, the synchronization detection signal is shared between the first array light source 210 and the second array light source 220.

Figure 5:
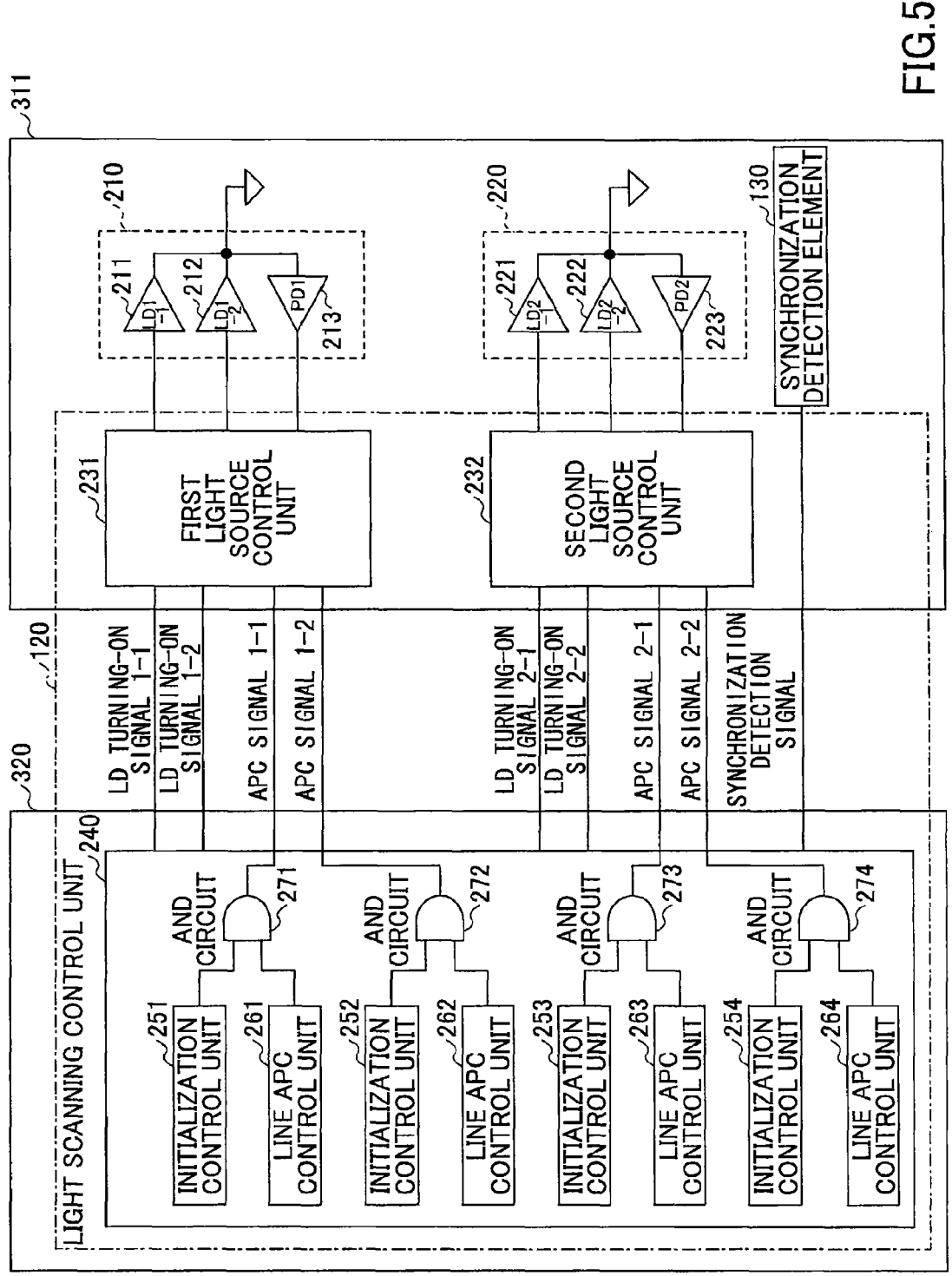
FIG. 5 is a diagram illustrating a light write driving unit in the case where a synchronization detection signal is shared.

FIG. 5 illustrates the light write driving unit using the synchronization detection element 130. The light write driving unit illustrated in FIG. 5 is formed by two substrates including the light source control substrate 311 and the write control substrate 320. The light source control substrate 311 is connected to the write control substrate 320 by a connection part such as a harness. The light source control substrate 311 includes the first array light source 210, the second array light source 220, the synchronization detection element 130, the first light source control unit 231, the second light source control unit 232, etc. Further, the write control substrate 320 includes the write control unit 240, etc. It should be noted that a power supply and a GND are connected to the light write driving unit by a connection part such as a harness.

The synchronization detection element 130 is disposed at a position onto which the laser light emitted from the first array light source 210 and the laser light emitted from the second array light source 220, which are reflected by the rotating polygon mirror 150, are incident.

Figure 6:
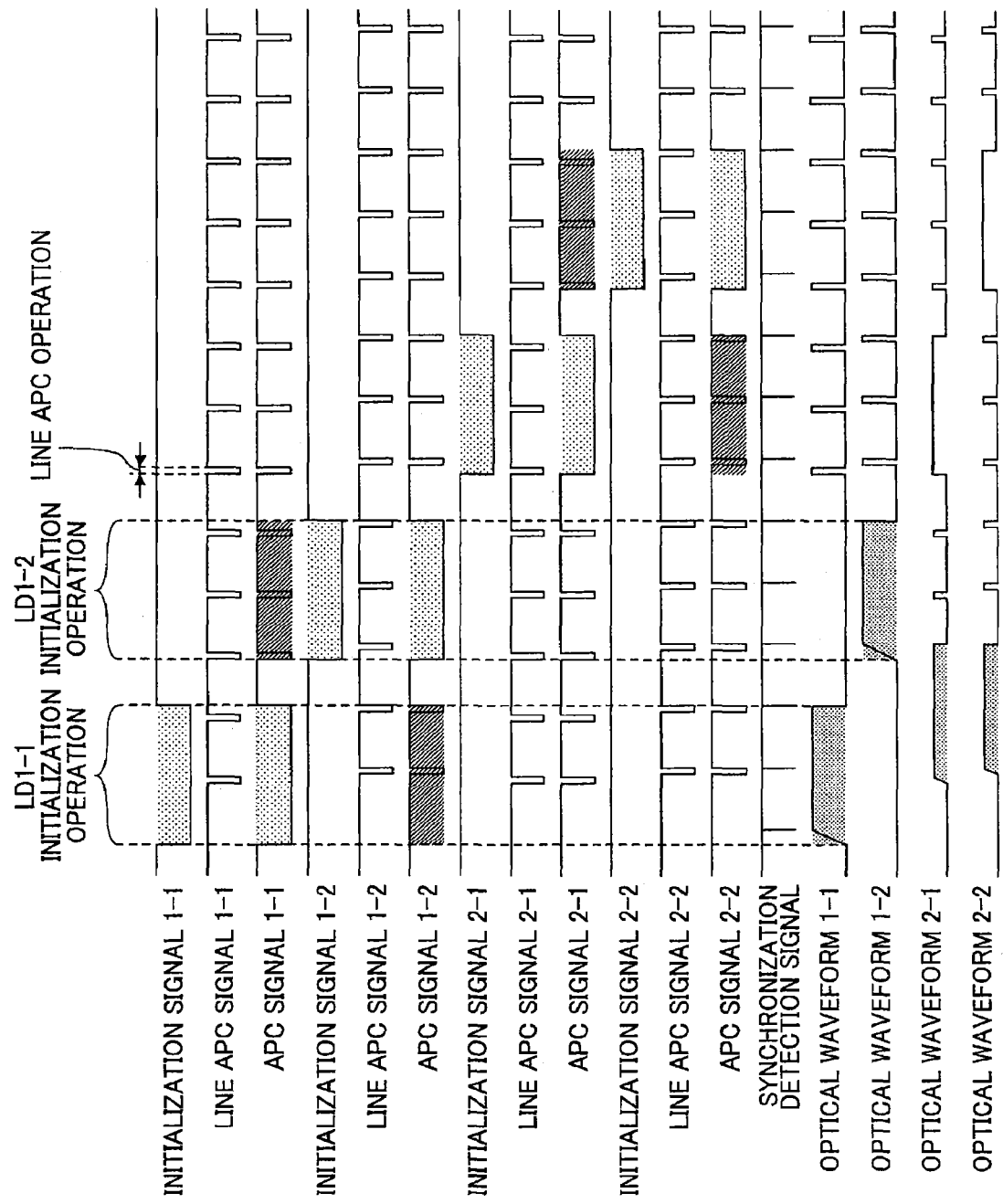
FIG. 6 is a timing chart illustrating initialization of a light source in the case where a synchronization detection signal is shared.

Next, referring to FIG. 6, operations of the light write driving unit sharing the synchronization detection signal illustrated in FIG. 5 will be described.

When power supply of the light scanning control unit is turned on, the light scanning control unit starts controlling the first array light source 210 and the second array light source 220 which are in a turn-off (no-lit) state. First, the light scanning control unit performs initialization of the first light-emitting unit 211 of the first array light source 210. The initialization of the first light-emitting unit 211 of the first array light source 210 is performed by causing the first light-emitting unit 211 of the first array light source 210 to be turned on and emit light as illustrated by an optical waveform 1-1 according to the initialization signal 1-1.

Specifically, the initialization signal 1-1 and the line APC signal 1-1 are low-active signals, and the first light-emitting unit 211 of the first array light source 210 is turned on when the signals are in a L state. A logical conjunction of the initialization signal 1-1 and the line APC signal 1-1 is output as the APC signal 1-1 by the AND circuit 271. Therefore, in the case where the initialization signal 1-1 is in a L state, the APC signal 1-1 output from the AND circuit 271 is also in a L state. With the above operation, the first light-emitting unit 211 of the first array light source 210 is turned on, and laser light is emitted from the first light-emitting unit 211 of the first array light source 210. In this state, the polygon mirror 150 is rotating, and the laser light emitted from the first light-emitting unit 211 of the first array light source 210 is incident onto the synchronization detection element 130 at a timing corresponding to the rotation of the polygon mirror 150. In the synchronization detection element 130, a synchronization detection signal is generated and transmitted to the write control unit 240 every time the laser light is incident onto the synchronization detection element 130. The synchronization detection signal is also a low-active signal. After the first light-emitting unit 211 of the first array light source 210 is turned on, when the synchronization detection signal is input to the write control unit 240 for a predetermined number of times (e.g., three times as illustrated in FIG. 6), the initialization signal 1-1 becomes a H state. When the initialization signal 1-1 becomes a H state, the APC signal 1-1 output from the AND circuit 271 also becomes a H state, and the first light-emitting unit 211 of the first array light source 210 is turned off.

The line APC signal 1-1 and the line APC signal 1-2 are generated by the line APC control unit 261 and the line APC control unit 262, respectively, based on the synchronization detection signal input to the write control unit 240. The APC signal 1-1 and the APC signal 1-2 output from the write control unit 240 are input to the first light source control unit 231. The first light source control unit 231 is controlled in such a way that the APC signal of one light-emitting unit is not accepted when the other light-emitting unit is being initialized.

It should be noted that in the light write driving unit illustrated in FIG. 5, there is only one synchronization detection element 130, and the synchronization detection signal is shared. Therefore, the laser light emitted from the first light-emitting unit 211 of the first array light source 210 for the initialization is reflected by the rotating polygon mirror 150, and the reflected laser light is incident onto the synchronization detection element 130. At the synchronization detection element 130, the synchronization detection signal is generated due to the laser light incident onto the synchronization detection element 130, and input to the write control unit 240. In the write control unit 240, based on the input synchronization detection signal, the line APC signal 1-1 is generated by the line APC control unit 261 and the line APC signal 1-2 is generated by the line APC control unit 262. Further, the line APC signal 2-1 is generated by the line APC control unit 263, and the line APC signal 2-2 is generated by the line APC control unit 264.

In addition to the line APC signal 1-1 and the line APC signal 1-2, the line APC signal 2-1 and the line APC signal 2-2 are generated because the synchronization detection signal from the synchronization detection element 130 is shared by the first array light source 210 and the second array light source 220.

As described above, when the line APC signal 2-1 and the line APC signal 2-2 are generated in a state where the first light-emitting unit 211 of the first array light source 210 is being initialized, the first light-emitting unit 221 and the second light-emitting unit 222 of the second array light source 220 are also turned on for initialization. In other words, the APC signal 2-1 and the APC signal 2-2 are input to the second light source control unit 232 earlier than the initialization signal 2-1 and the initialization signal 2-2 for initialization of the first light-emitting unit 221 and the second light-emitting unit 222 of the second array light source 220. The first light source control unit 231 and the second light source control unit 232 start initialization at a timing when the first APC signal becomes a L state right after the power supply is turned on. Therefore, when the APC signal 2-1 and the APC signal 2-2 are input to the second light source control unit 232, the first light-emitting unit 221 and the second light-emitting unit 222 of the second array light source 220 are turned on. In the second array light source 220, there is only one light-receiving unit 223. As a result, both the laser light emitted by the first light-emitting unit 221 of the second array light source 220 and the the laser light emitted by the second light-emitting unit 222 are incident onto the light-receiving unit 223. The light-receiving unit 223 cannot separate the amount of the laser light emitted from the first light-emitting unit 221 of the second array light source 220 and the laser light emitted from the second light-emitting unit 222, which are incident onto the light-receiving unit 223 at the same time. As a result, the initialization for the first light-emitting unit 221 and the second light-emitting unit 222 of the second array light source 220 cannot be performed properly.

As described above, in the case where the number of the synchronization detection elements is simply reduced to one, the initialization of the first light-emitting unit 221 and the second light-emitting unit 222 of the second array light source 220 cannot be performed properly.

(Write Control Sharing the Synchronization Detection Signal According to an Embodiment)

Next, referring to FIG. 7 and FIG. 8, write control sharing the synchronization detection signal according to an embodiment will be described. It should be noted that the write control is performed in the write control unit 241.

Figure 7:
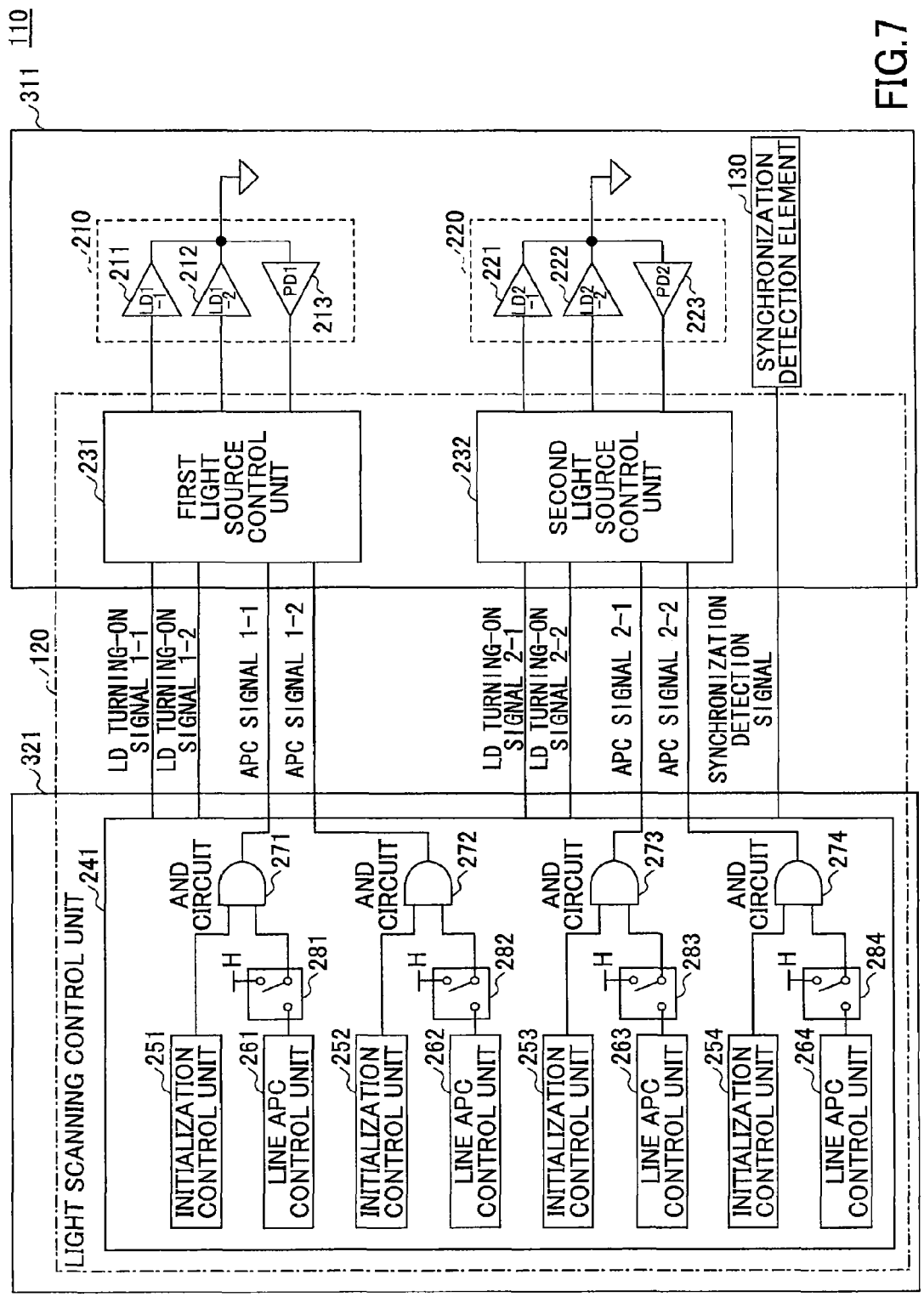
FIG. 7 is a diagram (1) illustrating a light write driving unit in the case where a synchronization detection signal according to an embodiment is shared.

FIG. 7 illustrates a light write driving unit 110 of the light beam scanning apparatus according to an embodiment. The light write driving unit 110 performs write control sharing the synchronization detection signal by using a single synchronization detection element 130. The light write driving unit illustrated in FIG. 7 is formed by two substrates including the light source control substrate 311 and the write control substrate 321. The light source control substrate 311 is connected to the write control substrate 321 by a connection part such as a harness. The light source control substrate 311 includes the first array light source 210, the second array light source 220, the synchronization detection element 130, the first light source control unit 231, the second light source control unit 232, etc. Further, the write control substrate 321 includes the write control unit 241, etc. It should be noted that a power supply and a GND are connected to the light write driving unit 110 by a connection part such as a harness.

The synchronization detection element 130 is disposed at a position where the laser light emitted from the first array light source 210 and the laser light emitted from the second array light source 220, which are reflected by the rotating polygon mirror 150, are incident.

The write control unit 241 includes initialization control units, line APC control units, AND circuits, and signal control units, the numbers of which correspond to the number of the light-emitting units.

Specifically, the write control unit 241 includes the initialization control unit 251, the line APC control unit 261, the AND circuit 271, and a signal control unit 281, which correspond to the first light-emitting unit 211 of the first array light source 210. The initialization control unit 251 outputs an initialization signal 1-1 for initialization of the first light-emitting unit 211 of the first array light source 210. The line APC control unit 261 outputs a line APC signal for APC control of the first light-emitting unit 211 of the first array light source 210. An output of the line APC control unit 261 is input to the signal control unit 281. The initialization signal 1-1 output from the initialization control unit 251 and an output from the signal control unit 281 are input to the AND circuit 271. The AND circuit 271 outputs as the APC signal 1-1 a logical conjunction of the initialization signal 1-1 output from the initialization control unit 251 and the output from the signal control unit 281. The signal control unit 281 is a switch or the like. By switching a contact, the signal control unit 281 can select between a case where the line APC signal 1-1 output from the line APC control unit 261 is input to the AND circuit 271 and a case where a H state signal is input to the AND circuit 271.

Further, the write control unit 241 includes the initialization control unit 252, the line APC control unit 262, the AND circuit 272, the signal control unit 282, which correspond to the second light-emitting unit 212 of the first array light source 210. The initialization control unit 252 outputs the initialization signal 1-2 for initialization of the second light-emitting unit 212 of the first array light source 210. The line APC control unit 262 outputs the line APC signal for APC control of the second light-emitting unit 212 of the first array light source 210. An output of the line APC control unit 262 is input to the signal control unit 282. The initialization signal 1-2 output from the initialization control unit 252 and an output from the signal control unit 282 are input to the AND circuit 272. The AND circuit 272 outputs as the APC signal 1-2 a logical conjunction of the initialization signal 1-2 output from the initialization control unit 252 and the output from the signal control unit 282. The signal control unit 282 is a switch or the like. By switching a contact, the signal control unit 281 can select between a case where the line APC signal 1-2 output from the line APC control unit 262 is input to the AND circuit 272 and a case where a H state signal is input to the AND circuit 272.

Further, the write control unit 241 includes the initialization control unit 253, the line APC control unit 263, the AND circuit 273, the signal control unit 283, which correspond to the first light-emitting unit 221 of the second array light source 220. The initialization control unit 253 outputs the initialization signal 2-1 for initialization of the first light-emitting unit 221 of the second array light source 220. The line APC control unit 263 outputs the line APC signal 2-1 for APC control of the first light-emitting unit 221 of the second array light source 220. An output of the line APC control unit 263 is input to the signal control unit 283. The initialization signal 2-1 output from the initialization control unit 253 and an output from the signal control unit 283 are input to the AND circuit 273. The AND circuit 273 outputs as the APC signal 2-2 a logical conjunction of the initialization signal 2-1 output from the initialization control unit 253 and the output from the signal control unit 283. The signal control unit 283 is a switch or the like. By switching a contact, the signal control unit 281 can select between a case where the line APC signal 2-1 output from the line APC control unit 263 is input to the AND circuit 273 and a case where a H state signal is input to the AND circuit 273.

Further, the write control unit 241 includes the initialization control unit 254, the line APC control unit 264, the AND circuit 274, the signal control unit 284, which correspond to the second light-emitting unit 222 of the second array light source 220. The initialization control unit 254 outputs the initialization signal 2-2 for initialization of the second light-emitting unit 222 of the second array light source 220. The line APC control unit 264 outputs the line APC signal for APC control of the second light-emitting unit 222 of the second array light source 220. An output of the line APC control unit 264 is input to the signal control unit 284. The initialization signal 2-2 output from the initialization control unit 254 and an output from the signal control unit 284 are input to the AND circuit 274. The AND circuit 274 outputs as the APC signal 2-2 a logical conjunction of the initialization signal 2-2 and the output from the signal control unit 284. The signal control unit 284 is a switch or the like. By switching a contact, the signal control unit 281 can select between a case where the line APC signal 2-2 output from the line APC control unit 264 is input to the AND circuit 274 and a case where a H state signal is input to the AND circuit 274.

The first light source control unit 231 is connected to the write control unit 241. The APC signal 1-1, the APC signal 1-2, the LD turning-on signal 1-1, and the LD turning-on signal 1-2, output from the write control unit 241, are input to the first light source control unit 231. Further, the second light source control unit 232 is connected to the write control unit 241. The APC signal 2-1, the APC signal 2-2, the LD turning-on signal 2-1, and the LD turning-on signal 2-2, output from the write control unit 241, are input to the second light source control unit 232.

Further, the synchronization detection element 130 outputs the synchronization detection signal when the laser light reflected by the mirror surface of the rotating polygon mirror 150 is incident onto the synchronization detection element 130. The output synchronization detection signal is input to the write control unit 241. Specifically, the laser light emitted from the first light-emitting unit 211 and the second light-emitting unit 212 of the first array light source 210 is reflected by the mirror surface of the polygon mirror 150. The reflected laser light is incident onto the synchronization detection element 130. Further, the laser light emitted from the first light-emitting unit 221 and the second light-emitting unit 222 of the second array light source 220 is reflected by the mirror surface of the polygon mirror 150. The reflected laser light is incident onto the synchronization detection element 130.

Next, referring to FIG. 8, operations of the light write driving unit 110 according to an embodiment sharing the synchronization detection signal illustrated in FIG. 7 will be described.

When power supply of the light scanning control unit is turned on, the light scanning control unit starts controlling the first array light source 210 and the second array light source 220 which are in a turn-off state. First, the light scanning control unit performs initialization of the first light-emitting unit 211 of the first array light source 210. The initialization of the first light-emitting unit 211 of the first array light source 210 is performed by causing the first light-emitting unit 211 of the first array light source 210 to be turned on and emit light as illustrated by an optical waveform 1-1 according to the initialization signal 1-1.

Specifically, the initialization signal 1-1 and the line APC signal 1-1 are low-active signals, and the first light-emitting unit 211 of the first array light source 210 is turned on when in a L state. A logical conjunction of the initialization signal 1-1 and the line APC signal 1-1 is output as the APC signal 1-1 by the AND circuit 271. Therefore, in the case where the initialization signal 1-1 is in a L state, the APC signal 1-1 output from the AND circuit 271 is also in a L state. With the above operation, the first light-emitting unit 211 of the first array light source 210 is turned on, and laser light is emitted from the first light-emitting unit 211 of the first array light source 210. In this state, the polygon mirror 150 is rotating, and the laser light emitted from the first light-emitting unit 211 of the first array light source 210 is incident onto the synchronization detection element 130 at a timing according to the rotation of the polygon mirror 150. In the synchronization detection element 130, a synchronization detection signal is generated and transmitted to the write control unit 241 every time when the laser light is incident onto the synchronization detection element 130. The synchronization detection signal is also a low-active signal. After the first light-emitting unit 211 of the first array light source 210 is turned on, when the synchronization detection signal is input to the write control unit 241 for a predetermined number of times (e.g., three times as illustrated in FIG. 8), the initialization signal 1-1 becomes a H state. When the initialization signal 1-1 becomes a H state, the APC signal 1-1 output from the AND circuit 271 also becomes a H state, and the first light-emitting unit 211 of the first array light source 210 is turned off.

In an embodiment, the line APC signal 1-1, the line APC signal 1-2, the line APC signal 2-1, and the line APC signal 2-2 are generated based on the synchronization detection signal input to the write control unit 241. Specifically, based on the synchronization detection signal input to the write control unit 241, the line APC signal 1-1 is generated by the line APC control unit 261, and the line APC signal 1-2 is generated by the line APC control unit 262. Similarly, based on the synchronization detection signal input to the write control unit 241, the line APC signal 2-1 is generated by the line APC control unit 263, and the line APC signal 2-2 is generated by the line APC control unit 264. It should be noted that, in FIG. 8 and FIG. 9 which will be referred to later, a dashed line in the line APC signal 2-1 indicates an output from the line APC control unit 263, and a solid line indicates an output from the signal control unit 283 that is connected to the line APC control unit 263. Further, a dashed line in the line APC signal 2-2 indicates an output from the line APC control unit 264, and a solid line indicates an output from the signal control unit 284 that is connected to the line APC control unit 264.

Figure 8:
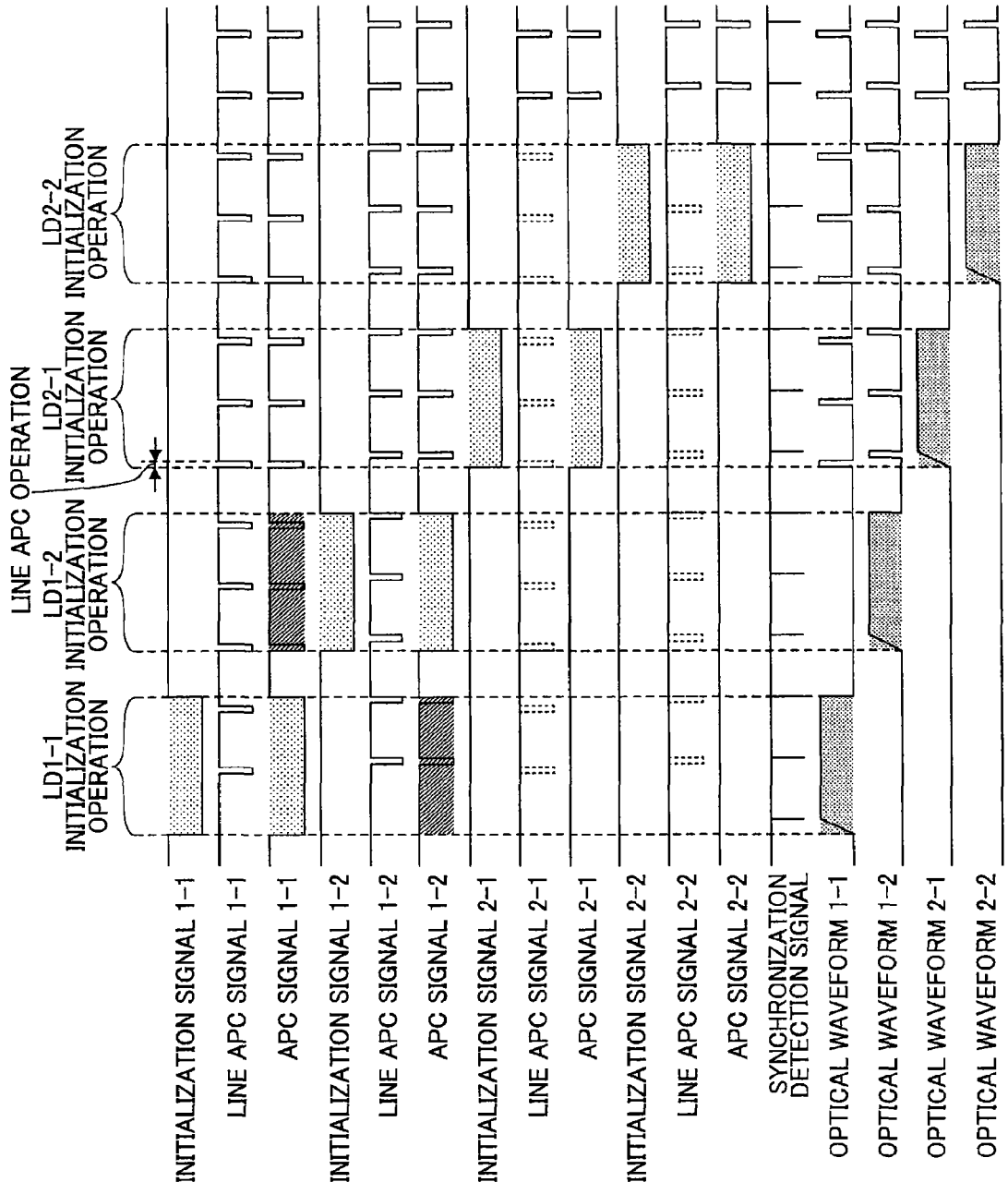
FIG. 8 is a timing chart (1) illustrating initialization of light source in the case where a synchronization detection signal is shared.

In a case illustrated in FIG. 8, the signal control unit 281 is connected to the line APC control unit 261 and the signal control unit 282 is connected to the line APC control unit 262 from the very beginning when the power supply is turned on. Therefore, the line APC signal 1-1 output from the line APC control unit 261 is input to the AND circuit 271 via the signal control unit 281, and the line APC signal 1-2 output from the line APC control unit 262 is input to the AND circuit 272 via the signal control unit 282.

Further, in the signal control unit 283 and the signal control unit 284, the contact is connected to a H state from the very beginning when power supply is turned on to when initialization of the second light-emitting unit 222 of the second array light source 220 is completed. After the initialization of the second light-emitting unit 222 of the second array light source 220 is completed, the contact is connected to the line APC control unit 263 in the signal control unit 283, and the contact is connected to the line APC control unit 264 in the signal control unit 284.

Therefore, from the very beginning when power supply is turned on to when initialization of the second light-emitting unit 222 of the second array light source 220 is completed, a H state signal instead of the APC signal 2-1 is input to the AND circuit 273, and a H state signal instead of the APC signal 2-2 is input to the AND circuit 274. Further, after the initialization of the second light-emitting unit 222 of the second array light source 220 is completed, the line APC signal 2-1 output from the line APC control unit 263 is input to the AND circuit 273 via the signal control unit 283. Similarly, after the initialization of the second light-emitting unit 222 of the second array light source 220 is completed, the line APC signal 2-2 output from the line APC control unit 264 is input to the AND circuit 274 via the signal control unit 284.

The APC signal 1-1 and the APC signal 1-2 output from the write control unit 240 are input to the first light source control unit 231. The first light source control unit 231 is controlled in such a way that the APC signal of one light-emitting unit is not accepted when the other light-emitting unit is being initialized. Specifically, the first light source control unit 231 is controlled in such a way that the line APC signal 1-2 is not accepted when the first light-emitting unit 211 of the first array light source 210 is being initialized. With the above operation, a state is maintained in which only the first light-emitting unit 211 of the first array light source 210 is turned on and the second light-emitting unit 212 of the first array light source 210 is not turned on. As a result, initialization of the first light-emitting unit 211 of the first array light source 210 can be performed. Further, the second light source control unit 232 controls the first light-emitting unit 221 and the second light-emitting unit 222 of the second array light source 220 in the same way.

It should be noted that, when the first light-emitting unit 211 of the first array light source 210 is turned on and being initialized, the line APC signal 2-1 is generated by the line APC control unit 263, and the line APC signal 2-2 is generated by the line APC control unit 264 based on the synchronization detection signal. However, when the first light-emitting unit 211 of the first array light source 210 is turned on and being initialized, the contact in the signal control unit 283 and the contact in the signal control unit 284 are connected to a H state, a H state signal instead of the APC signal 2-1 is input to the AND circuit 273, and a H state signal instead of the APC signal 2-2 is input to the AND circuit 274. Therefore, the APC signal 2-1 output from the AND circuit 273 is in a H state until the initialization signal 2-1 is input, and the APC signal 2-2 output from the AND circuit 274 is in a H state until the initialization signal 2-2 is input.

Therefore, when the first light-emitting unit 211 of the first array light source 210 is turned on and being initialized, the APC signal 2-1 and the APC signal 2-2 are in a H state, and the first light-emitting unit 221 and the second light-emitting unit 222 of the second array light source 220 will not be turned on or initialized.

After the initialization of the first light-emitting unit 211 of the first array light source 210 is completed, the initialization of the second light-emitting unit 212 of the first array light source 210 is performed in the similar manner. The initialization of the second light-emitting unit 212 of the first array light source 210 is performed by causing the second light-emitting unit 212 of the first array light source 210 to be turned on and emit light as illustrated by an optical waveform 1-2 according to the initialization signal 1-2. It should be noted that, when the second light-emitting unit 212 of the first array light source 210 is turned on and being initialized, the APC signal 2-1 and the APC signal 2-2 are in a H state, and the first light-emitting unit 221 and the second light-emitting unit 222 of the second array light source 220 will not be turned on or initialized.

After the initialization of the second light-emitting unit 212 of the first array light source 210 is completed, the initialization of the first light-emitting unit 221 of the second array light source 220 is performed. At this time, the initialization signal 2-1 output from the initialization control unit 253 and the signal in a H state output from the signal control unit 283 are input to the AND circuit 273, and the APC signal 2-1 is output from the AND circuit 273. Based on the APC signal 2-1 output from the AND circuit 273, the first light-emitting unit 221 of the second array light source 220 is caused to emit light as illustrated by an optical waveform 2-1, and initialization of the first light-emitting unit 221 of the second array light source 220 is performed.

Next, after the initialization of the first light-emitting unit 221 of the second array light source 220 is completed, the initialization of the second light-emitting unit 222 of the second array light source 220 is performed. At this time, the initialization signal 2-2 output from the initialization control unit 254 and the signal in a H state output from the signal control unit 284 are input to the AND circuit 274, and the APC signal 2-2 is output from the AND circuit 274. Based on the APC signal 2-2 output from the AND circuit 274, the second light-emitting unit 222 of the second array light source 220 is caused to emit light as illustrated by an optical waveform 2-2, and initialization of the second light-emitting unit 222 of the second array light source 220 is performed.

After the initialization of the second light-emitting unit 222 of the second array light source 220 is completed, the contact is switched to be connected to the line APC control unit 263 in the signal control unit 283, and the contact is switched to be connected to the line APC control unit 264 in the signal control unit 284. With the above operation, the line APC signal 2-1 output from the line APC control unit 263 is input to the AND circuit 273 via the signal control unit 283. Line APC control is performed for the first light-emitting unit 221 of the second array light source 220 according to the APC signal 2-1 output from the AND circuit 273. Further, the line APC signal 2-2 output from the line APC control unit 264 is input to the AND circuit 274 via the signal control unit 284. Line APC control is performed for the second light-emitting unit 222 of the second array light source 220 according to the APC signal 2-2 output from the AND circuit 274.

As described above, in the light beam scanning apparatus including the light write driving unit 110 according to an embodiment as illustrated in FIG. 7, initialization of each light-emitting unit in the first array light source 210 and the second array light source 220 can be properly performed even in the case where the number of the synchronization detection elements 130 is one. It should be noted that the signal control unit 281, etc., are disposed between the line APC control unit 261, etc., and the AND circuit 271, etc., in the above description, but the signal control unit 281, etc., may be included in the line APC control unit 261, etc. The same light source initialization as illustrated in a timing chart in FIG. 8 can be performed even when the signal control unit 281, etc., are included in the line APC control unit 261, etc.

Figure 9:
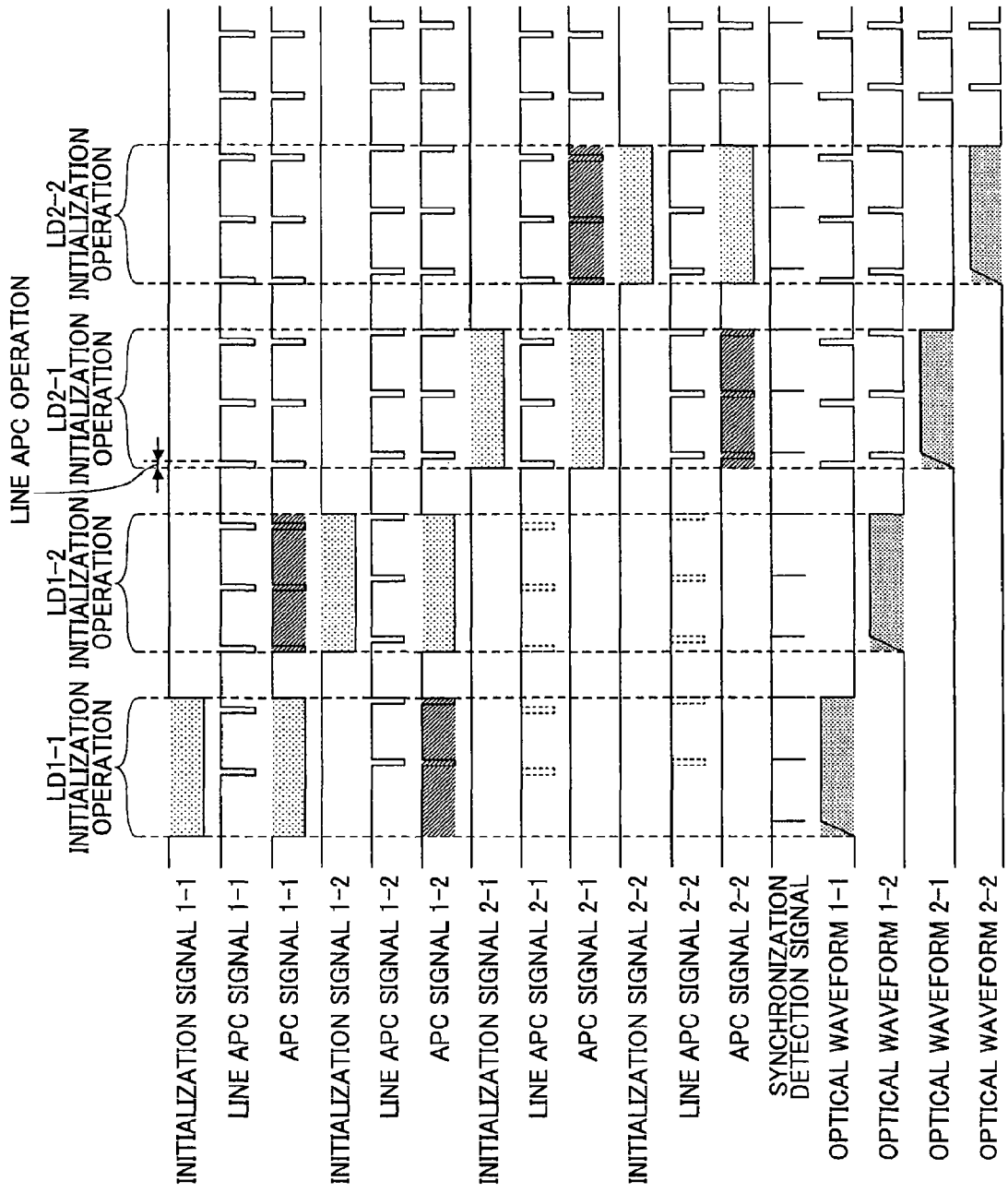
FIG. 9 is a timing chart (2) illustrating initialization of light source in the case where a synchronization detection signal is shared.

In FIG. 8, a case is illustrated where a period when the contact is connected to a H state in the signal control unit 283 and the signal control unit 284 is from when the very beginning when power supply is turned on to when initialization of the second light-emitting unit 222 of the second array light source 220 is completed. The period may be shorter than the above. Specifically, the period when the contact is connected to a H state in the signal control unit 283 and the signal control unit 284 may be shorter than the above as long as the period when the contact is connected to a H state in the signal control unit 283 and the signal control unit 284 is longer than a period from when the very beginning when power supply is turned on to when initialization of the second light-emitting unit 212 of the first array light source 210 is completed as illustrated in FIG. 9. In other words, the period when the contact is connected to a H state in the signal control unit 283 and the signal control unit 284 starts when power supply is turned on, and ends between when the initialization of the second light-emitting unit 212 of the first array light source 210 is completed and when the initialization of the second light-emitting unit 222 of the second array light source 220 is completed.

Further, the period when the contact is connected to a H state in the signal control unit 283 and the signal control unit 284 may be controlled by the synchronization detection signal from the synchronization detection element 130. Specifically, the write control unit 241 may count the number of the synchronization detection signals input to the write control unit 241, and the contact is connected to a H state in the signal control unit 283 and the signal control unit 284 until the number of the synchronization detection signals input to the write control unit 241 reaches a predetermined number.

Figure 10:
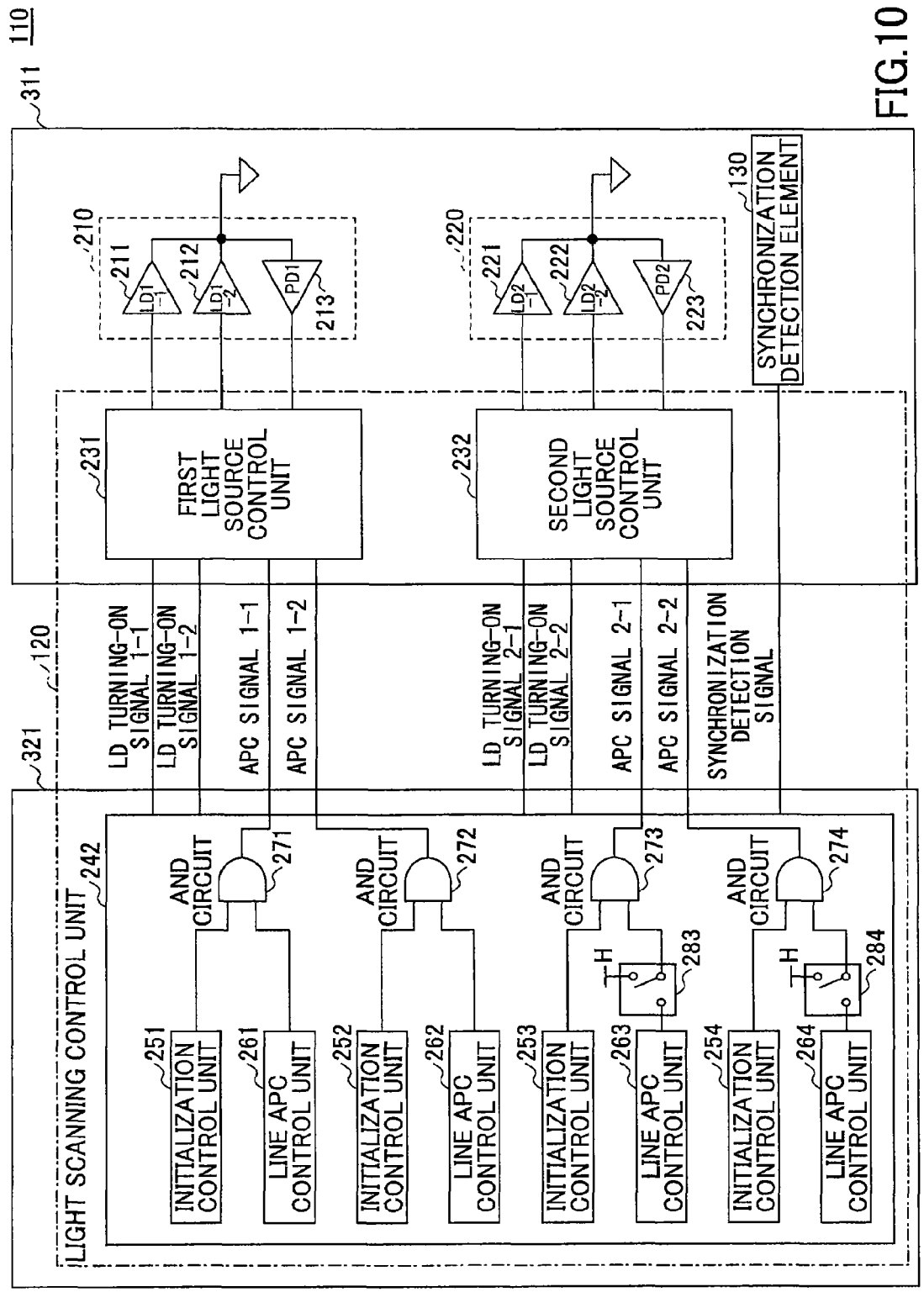
FIG. 10 is a diagram (2) illustrating a light write driving unit in the case where a synchronization detection signal according to an embodiment is shared.

Further, the write control 241 including four sets of the initialization control unit, the line APC control unit, the AND circuit, and the signal control unit is illustrated in FIG. 7. However, the same operation may be performed even if the sets corresponding to the first array light source 210 do not include the signal control unit. In other words, as illustrated in FIG. 10, in the write control unit 242, the signal control unit may be included in only the sets corresponding to the second array light source 220 and may not be included in the sets corresponding to the first array light source 210.

Specifically, the write control unit 242 includes the initialization control unit 251, the line APC control unit 261, and the AND circuit 251, which correspond to the first light-emitting unit 211 of the first array light source 210. The initialization signal 1-1 output from the initialization control unit 251 and the line APC signal 1-1 output from the line APC control unit 261 are input to the AND circuit 271. The AND circuit 271 outputs a logical conjunction of the initialization signal 1-1 and the line APC signal 1-1 as the APC signal 1-1.

Further, the write control unit 242 includes the initialization control unit 252, the line APC control unit 262, and the AND circuit 272, which correspond to the second light-emitting unit 212 of the first array light source 210. The initialization signal 1-2 output from the initialization control unit 252 and the line APC signal 1-2 output from the line APC control unit 262 are input to the AND circuit 272. The AND circuit 272 outputs a logical conjunction of the initialization signal 1-2 and the line APC signal 1-2 as the APC signal 1-2.

Further, the write control unit 242 includes the initialization control unit 253, the line APC control unit 263, the AND circuit 273, and the signal control unit 283, which correspond to the first light-emitting unit 221 of the second array light source 220. An output of the line APC control unit 263 is input to the signal control unit 283. The initialization signal 2-1 output from the initialization control unit 253 and an output from the signal control unit 283 are input to the AND circuit 273. The AND circuit 273 outputs as the APC signal 2-1 a logical conjunction of the initialization signal 2-1 and the output from the signal control unit 283.

Further, the write control unit 242 includes the initialization control unit 254, the line APC control unit 264, the AND circuit 274, and the signal control unit 284, which correspond to the second light-emitting unit 222 of the second array light source 220. An output of the line APC control unit 264 is input to the signal control unit 284. The initialization signal 2-2 output from the initialization control unit 254 and an output from the signal control unit 284 are input to the AND circuit 274. The AND circuit 274 outputs as the APC signal 2-2 a logical conjunction of the initialization signal 2-2 and the output from the signal control unit 284.

A case is described where there are two light-emitting units in an array light source and there are two array light sources in the above description. However, the number of the light-emitting units included in an array light source may be more than two, and the number of the array light sources may be more than two. In other words, the number of the light-emitting units included in an array light source may be three or more, and the number of the array light sources may be three or more. In this case, the number of the initialization control units, the line APC control units, the AND circuits, the signal control units, etc., increases according to the number of the light-emitting units, and the number of the light source control units increases according to the number of the array light sources.

Embodiments of the present disclosure have been described above. The above descriptions do not limit the scope of the present disclosure.

The present application is based on and claims the benefit of priority of Japanese Priority Application No. 2015-152457 filed on Jul. 31, 2015, the entire contents of which are hereby incorporated herein by reference.

What is claimed is:

1. A light beam scanning apparatus comprising:
a first array light source including a plurality of light emitters and a light receiver;
a second array light source including a plurality of light emitters and a light receiver;
a first light source controller configured to control light emission of the light emitters of the first array light source;
a second light source controller configured to control light emission of the light emitters of the second array light source;
write control circuitry configured to control the first light source controller and the second light source controller;
a deflector to deflect a direction of light emitted from the light emitters of the first array light source and the light emitters of the second array light source; and a synchronization detector configured to generate a synchronization detection signal according to the light, deflected by the deflector, incident onto the synchronization detector, wherein:

APC ("Automatic Power Control") signals corresponding to the light emitters are respectively input to the first light source controller and the second light source controller, each of the APC signals includes a corresponding line APC signal which corresponds to a respective one of the light emitters and is generated based on the synchronization detection signal, and an initialization signal for initializing said respective one of the light emitters, initialization of the light emitters of the second array light source is performed after initialization of the light emitters of the first array light source is performed, and when the initialization of the light emitters of the first array light source is being performed, a signal for causing the light emitters of the second array light source not to emit light is input to the second light source controller.

2. The light beam scanning apparatus according to claim 1, wherein:

the line APC signals and the initialization signals are input to logic elements of the corresponding light emitters;

each of the APC signals is obtained by combining the corresponding line APC signal and the corresponding initialization signal; and when the initialization of the light emitters of the first array light source is being performed, instead of the corresponding line APC signal, a signal for causing the light emitters of the second array light source not to emit light is input to the logic elements of the light emitters of the second array light source.

3. The light beam scanning apparatus according to claim 2, wherein:

a period when the signal for causing the light emitters of the second array light source not to emit light is input to the logic elements of the light emitters of the second array light source instead of the line APC signal, is until initialization for all of the light emitters of the first array light source and the second array light source is completed.

4. The light beam scanning apparatus according to claim 1, wherein:

the each of the line APC signals and the corresponding initialization signals is a L active signal;

each of the line APC signals and the corresponding initialization signals are input to a corresponding AND circuit corresponding to each of the light emitters;

each of the APC signals is a signal of a logical conjunction of the corresponding line APC signal and the corresponding initialization signal, output from the AND circuit; and when the initialization of the light emitters of the first array light source is being performed, instead of the corresponding line APC signal, a H state signal is input to the AND circuit corresponding to each of the light emitters of the second array light source.

5. The light beam scanning apparatus according to claim 4, wherein:

a period when the H state signal is input to the AND circuit corresponding to each of the light emitters of the second array light source instead of the corresponding line APC signal, continues until initialization for all of the light emitters of the first array light source and the second array light source is completed.

6. The light beam scanning apparatus according to claim 4, wherein:

each of the line APC signals is generated by a corresponding line APC controller;

a signal controller is disposed between a corresponding one of the line APC controllers and a corresponding one of the AND circuits corresponding to each of the light emitters of the second array light source;

during a period when each H state signal is input to the AND circuit corresponding to each of the light emitters of the second array light source instead of the corresponding line APC signal, each H state signal is input to the AND circuit from the corresponding signal controller; and after the period when each H state signal is input to the AND circuit corresponding to each of the light emitters of the second array light source instead of the corresponding line APC signal, each line APC controller and the AND circuit corresponding to each of the light emitters of the second array light source are connected by the corresponding signal controller.

7. The light beam scanning apparatus according to claim 4, wherein:

a period, during which each H state signal instead of the corresponding line APC signal is input to the AND circuit corresponding to each of the light emitters of the second array light source, is controlled by a number of times the synchronization detection signal is input to the write control circuitry.

8. The light beam scanning apparatus according to claim 1, wherein:

a number of the synchronization detector is one.

9. A light beam scanning method of a light beam scanning apparatus in which a first array light source including a plurality of light emitters and a light receiver; a second array light source including a plurality of light emitters and a light receiver; a first light source controller configured to control light emission of the light emitters of the first array light source; a second light source controller configured to control light emission of the light emitters of the second array light source; write control circuitry configured to control the first light source controller and the second light source controller; a deflector configured to deflect a direction of light emitted from the light emitters of the first array light source and the light emitters of the second array light source; and a synchronization detector configured to generate a synchronization detection signal according to the light, deflected by the deflector, incident onto the synchronization detector, are included, wherein APC ("Automatic Power Control") signals corresponding to the light emitters are respectively input to the first light source controller and the second light source controller, each of the APC signals includes a corresponding line APC signal which corresponds to a respective one of the light emitters and is generated based on the synchronization detection signal, and an initialization signal for initializing said respective one of the light emitters, the light beam scanning method comprising:

initializing the light emitters of the first array light source;

initializing the light emitters of the second array light source after initializing the light emitters of the first array light source, wherein when the initializing of the light emitters of the first array light source is being performed, a signal for causing the light emitters of the second array light source not to emit light is input to the second light source controller.

10. A non-transitory computer-readable recording medium having a program embodied therein for causing a light beam scanning apparatus in which a first array light source including a plurality of light emitters and a light receiver; a second array light source including a plurality of light emitters and a light receiver; a first light source controller configured to control light emission of the light emitters of the first array light source; a second light source controller configured to control light emission of the light emitters of the second array light source; write control circuitry configured to control the first light source controller and the second light source controller; a deflector configured to deflect a direction of light emitted from the light emitters of the first array light source and the light emitters of the second array light source; and a synchronization detector configured to generate a synchronization detection signal according to the light, deflected by the deflector, incident onto the synchronization detector, are included, wherein APC ("Automatic Power Control") signals corresponding to the light emitters are respectively input to the first light source controller and the second light source controller, each of the APC signals includes a corresponding line APC signal which corresponds to a respective one of the light emitters and is generated based on the synchronization detection signal, and an initialization signal for initializing said respective one of the light emitters, to perform a light beam scanning method, the light beam scanning method comprising:

initializing the light emitters of the first array light source;

initializing the light emitters of the second array light source after initializing the light emitters of the first array light source, wherein when the initializing of the light emitters of the first array light source is being performed, a signal for causing the light emitters of the second array light source not to emit light is input to the second light source controller.

* * * * *